(12) United States Patent
Arens et al.

(10) Patent No.: US 10,279,646 B2
(45) Date of Patent: May 7, 2019

(54) VENTILATED SEATBELT FOR EFFICIENT COOLING AND HEATING OF VEHICLE PASSENGERS

(71) Applicant: THE REGENTS OF THE UNIVERSITY OF CALIFORNIA, Oakland, CA (US)

(72) Inventors: Edward A. Arens, Berkeley, CA (US); Hui Zhang, Moraga, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 401 days.

(21) Appl. No.: 15/133,425

(22) Filed: Apr. 20, 2016

(65) Prior Publication Data
US 2016/0303943 A1    Oct. 20, 2016

Related U.S. Application Data

(63) Continuation of application No. PCT/US2014/061833, filed on Oct. 22, 2014.
(Continued)

(51) Int. Cl.
*F25B 21/02* (2006.01)
*B60H 1/00* (2006.01)
(Continued)

(52) U.S. Cl.
CPC ..... *B60H 1/00271* (2013.01); *B60H 1/00828* (2013.01); *B60H 1/2215* (2013.01);
(Continued)

(58) Field of Classification Search
CPC ............ B60H 1/00292; B60H 1/00271; B60H 1/00285; A41D 13/0053; A62B 17/005; F25D 2400/26
See application file for complete search history.

(56) References Cited

U.S. PATENT DOCUMENTS 3,820,842 A * 6/1974 Stephenson ............. B60R 21/18
280/733
5,533,354 A * 7/1996 Pirkle ................ A41D 13/0053
2/458

(Continued)

FOREIGN PATENT DOCUMENTS

| JP | 2001-163149 A | 6/2001 |
| JP | 2008-037326 A | 2/2008 |
| JP | 2010-173339 A | 8/2010 |

OTHER PUBLICATIONS

Korean Intellectual Property Organization (KIPO), International Search Report and Written Opinion, PCT/US2014/061833, dated Feb. 6, 2015, pp. 1-13, with claims searched, pp. 14-18. The foregoing PCT application corresponds to the US application filed herewith. The relevance of the three JP non-English language references cited herein is set forth in the foregoing international search report and written opinion and, therefore, a separate concise explanation of the relevance is not required.

*Primary Examiner* — Keith Raymond
*Assistant Examiner* — Kamran Tavakoldavani
(74) *Attorney, Agent, or Firm* — O'Banion & Ritchey LLP; John P. O'Banion (57) ABSTRACT

A vehicle seatbelt mounted, individualized climate control apparatus that provides substantially instantaneous heating or cooling of the occupant of a vehicle seat is presented. The apparatus has at least one housing with an inner chamber coupled to diffusers to deliver ambient, cooled or heated air from an air source through the chamber to the body of the occupant. Regardless of the cabin temperature, local conditioning of a seat occupant efficiently cools the front of the torso and dissipates the body's thermal plume or warms the torso in the alternative. The functional and safety aspects of conventional three-point seat belts remain unchanged and the apparatus can be used with retractable belts.

20 Claims, 5 Drawing Sheets

Related U.S. Application Data (60) Provisional application No. 61/894,687, filed on Oct. 23, 2013.

(51) Int. Cl.
*B60R 22/12* (2006.01)
*B60N 2/56* (2006.01)
*B60H 1/22* (2006.01)
*B60H 1/32* (2006.01)
*B60H 1/34* (2006.01)
*F25B 21/04* (2006.01)
*B60R 22/00* (2006.01)

(52) U.S. Cl.
CPC ......... *B60H 1/2218* (2013.01); *B60H 1/3204* (2013.01); *B60H 1/3205* (2013.01); *B60H 1/3407* (2013.01); *B60N 2/5635* (2013.01); *B60N 2/5657* (2013.01); *B60R 22/12* (2013.01); *F25B 21/02* (2013.01); *F25B 21/04* (2013.01); *B60H 2001/003* (2013.01); *B60R 2022/006* (2013.01)

(56) References Cited

U.S. PATENT DOCUMENTS

| | | | |
|---|---|---|---|
| 5,799,977 A | | 9/1998 | Miyazaki et al. |
| 6,082,763 A | * | 7/2000 | Kokeguchi ............. B60R 21/18 280/733 |
| 2008/0006036 A1 | * | 1/2008 | Askew .................. F24F 5/0042 62/3.3 |

* cited by examiner

VENTILATED SEATBELT FOR EFFICIENT COOLING AND HEATING OF VEHICLE PASSENGERS

CROSS-REFERENCE TO RELATED APPLICATIONS

This application is a 35 U.S.C. § 111(a) continuation of PCT international application number PCT/US2014/061833 filed on Oct. 22, 2014, incorporated herein by reference in its entirety, which claims priority to, and the benefit of, U.S. provisional patent application Ser. No. 61/894,687 filed on Oct. 23, 2013, incorporated herein by reference in its entirety. Priority is claimed to each of the foregoing applications.

The above-referenced PCT international application was published as PCT International Publication No. WO 2015/061494 on Apr. 30, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND

1. Technical Field

The present technology pertains generally to vehicle air conditioning systems, and more particularly to a seatbelt mounted air delivery apparatus for local conditioning of a seat occupant that is highly efficient at cooling the front of the torso and dissipating the body's thermal plume or warming the torso, regardless of the cabin air temperature.

2. Background

Vehicle climate conditioning systems are designed to provide a comfortable environment to the occupants within the cabin of the vehicle during travel. Most vehicles produce changes to the cabin environment with temperature modified air. Heat from the engine is captured and air is heated through heat exchangers and a blower is used to provide heated air to the cabin. Similarly, cool air is produced with a chiller and blower to introduce cool air into the cabin to cool the cabin environment. The entire cabin volume is typically heated or cooled as a whole by the vehicle conditioning system.

Temperatures in the cabin of the vehicle can reach extremes after periods of vacancy during summer and winter months. For example, in a short period of exposure, a vehicle parked or driving in the summer sun can encounter very high air temperatures in the cabin from radiant heat. The seats and dashboard that are exposed to the sun can also significantly increase in temperature contributing to a very hot cabin environment. Even with normal air-conditioning, the seats and cabin air temperature can remain significantly elevated and uncomfortable for an occupant for a substantial period of time after entering and driving the vehicle.

Likewise, there is a transition time needed to heat the cabin environment that has cold seats with heated air in the winter time. The heater of the vehicle is not only required to heat the air but the air must heat the seats and interior of the cabin as well to a temperature that is comfortable to the occupants. In both cases, the seats are heated or cooled during the transition period by the body of the occupant of the seat, greatly reducing the comfort level of the occupant.

To reduce the discomfort and transition time, conditioned seats were developed that have heating and cooling elements incorporated into the seats or that blow conditioned air through the surfaces of the seat. However, existing climate control systems for seats involve many expensive components that are not easily integrated into existing seat designs. Complex mechanical parts, additional electrical connections and ductwork greatly increase the cost of the seat. Consequently, climate controlled seats are an expensive option or only present in high end luxury priced vehicles and not widely used in the automotive industry because of the cost of manufacture.

Another drawback with climate controlled seats, in addition to complexity and cost, is that it is often necessary to compromise comfort and ergonomics in order to accommodate ductwork or heating or cooling elements and internal fans. It is often necessary to reduce or eliminate padding or have hard duct work and other components near the surfaces of the back and seat. These structural elements may reduce comfort to the occupant, particularly during long periods of travel.

Accordingly, there is a need for a system that provides individualized climate control for an occupant of a seat that produces substantially instantaneous heating or cooling that does not require modifications to the seat and is inexpensive to manufacture. The present technology satisfies these needs and is an improvement in the art.

BRIEF SUMMARY

The technology described herein provides an apparatus and methods for localized heating or cooling of an occupant of a vehicle seat. A lap length (from floor to buckle when retracted) embodiment and a lap-plus-chest length (from floor up through pulley and down when retracted) embodiment are used to illustrate the ventilated seatbelt attachment for efficient cooling and heating of passengers of automobiles or other vehicles that contain existing seatbelts.

The apparatus can be mounted, in part, to a standard three point seatbelt. However, the functional and safety aspects of current three-point seatbelts remain unchanged. The system does not modify the standard three-point seatbelt web material, strength, retractability or ease of use when mounted to the seatbelt. Appearance can also be minimal. All driver and passenger seats can be fitted or retrofitted with this seatbelt system.

In one embodiment, the apparatus has an internal channel or sleeve that retains the seatbelt of the vehicle. In another embodiment, the apparatus is sewn to the belt. The apparatus may also be coupled to the belt with reversable fasteners such as straps, snaps and hook and loop fasteners.

The apparatus has a sectional or continuous housing that has a central chamber that fills with ambient, cooled or heated air. Hoses connected to a source of temperature controlled air provide a flow of heated or cooled air to the apparatus. The air source can also be a blower that draws ambient air from the cabin of the vehicle without modification. In one embodiment, heating and/or cooling elements, such as a thermoelectric cooler/heater, can be positioned either upstream or downstream from the fan to cool or heat the air flowing into the housing of the apparatus. For the system in its ventilation mode or actively cooled mode, drawing supply air from the floor portion of the cabin brings in the coolest air available in the cabin. In another embodiment, the air source of the apparatus is supplied with cooled/heated air that is ducted from the automobile central air system. System fan and temperature controls may be mounted on the belt or can be part of the automobile central HVAC controls.

The housing has sections with diffusers such as mesh, perforations or directional nozzles that distribute air from the interior of housing to outside of the housing. The diffusing sections are typically located on the upper and lower sides of the housing as well as on the bottom belt side of the housing so that air is directed toward the head and pelvis of the occupant.

Air flows out of the housing to convectively, evaporatively, and conductively cool the occupant of the seat in the pelvic and chest regions. This local cooling is highly efficient at cooling the front of the torso and dissipating the body's thermal plume. In a hot car, the thermal plume is undesirable for both comfort and the passenger's perception of air quality. The movement of air inherently cools the body and disrupts the upward flowing thermal plume even if the ambient air is not cooled. Similarly, heated air from the sleeve may also be very efficient at warming the body, depending on the nature of the passenger's clothing.

In use, the apparatus engages the lap and chest of the user and the seatbelt operates normally. Air from the source is directed from the source through hoses and the housing of the apparatus attached to the seatbelt and ultimately to the body of the user to cool or heat the user near the belt points of engagement.

According to one aspect of the technology, an apparatus is provided with low-power direct cooling of automobile passengers after entering a heat-soaked cabin allowing the cooling (AC) systems of vehicles to be downsized and made more efficient.

Another aspect is to provide low-power direct heating of passengers in a cold-soaked cabin that reduces the required heating capacity of the heater of the vehicle.

A further aspect of the technology is to provide a ventilated seatbelt apparatus that reduces the power required to heat or cool the air in the cabin during steady-state operations.

Another aspect is to provide a ventilated seatbelt apparatus that provides comfort effects that are more immediate and localized than in conventional air conditioning systems since air is not blown into the eyes or across the hands of the driver.

Yet another aspect is to provide a ventilated seatbelt mounted apparatus for the efficient cooling of vehicle passengers that is very effective at removing body heat and disrupting the body's heated thermal plume which is a detriment to comfort and perceived air quality under warm and hot conditions.

Another aspect of the present technology is to provide a ventilated conditioning system which is relatively inexpensive to manufacture that can be easily adapted to use with conventional seatbelt designs.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Figure 2:
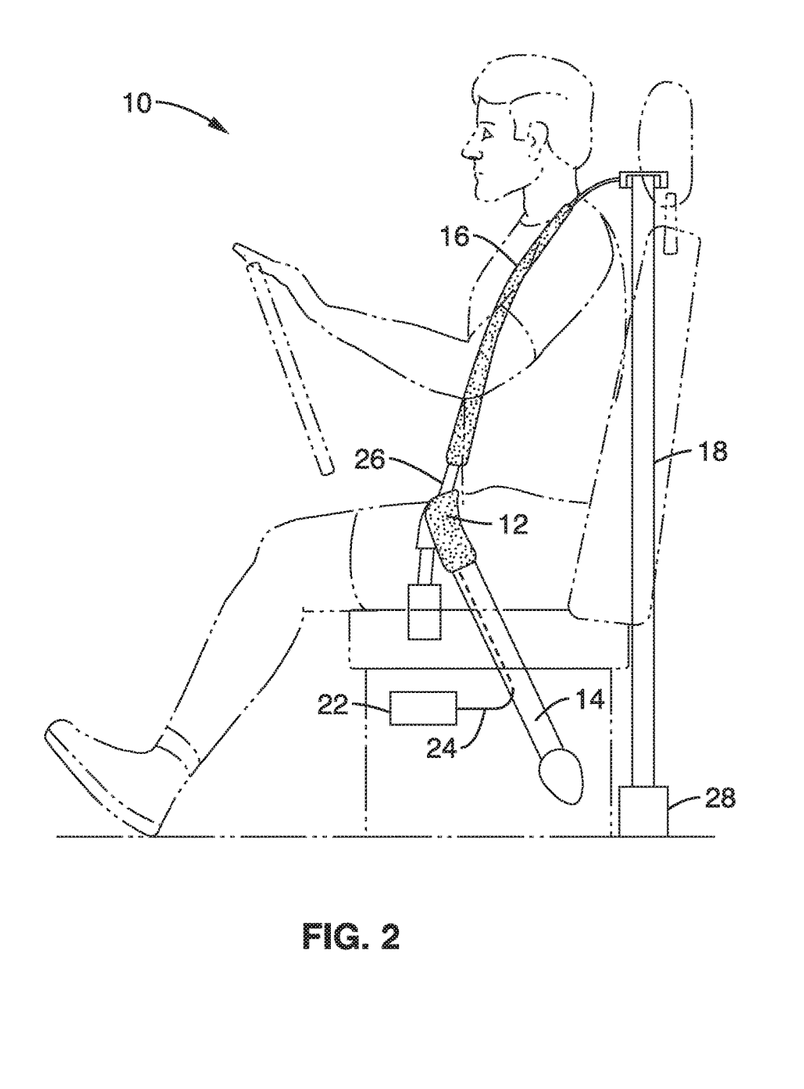
FIG. 2 is a side perspective view of the two panel embodiment of the apparatus shown in FIG. 1.
Figure 3A:
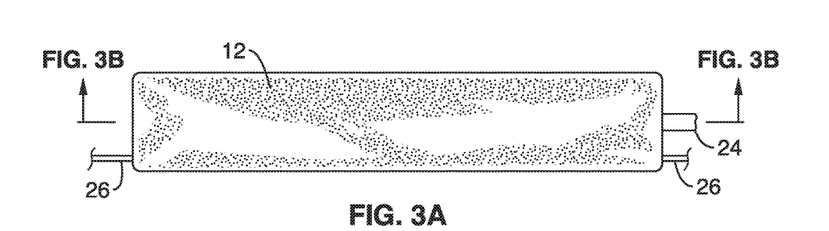
FIG. 3A is a top view of one panel of the apparatus.

Referring more specifically to the drawings, for illustrative purposes an embodiment of the apparatus of the present disclosure is depicted generally in FIG. 1 through FIG. 3B as shown in the context of use. A second embodiment is shown in FIG. 4A and FIG. 4B in a retracted state while not in use. By way of example, and not of limitation, the apparatus 10 generally provides seatbelt mounted panels that emit heated or cooled air directly to the body of the occupant of the seat. Although a single system is illustrated in the figures, it will be understood that each seatbelt in a vehicle can be equipped with the apparatus.

Figure 1:
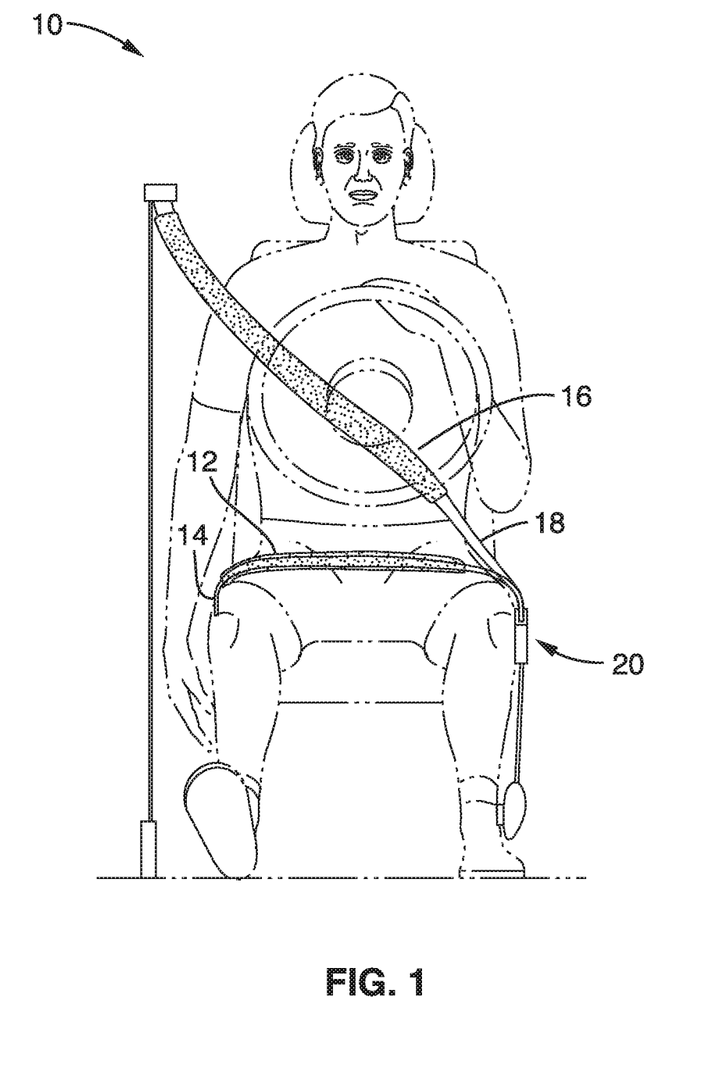
FIG. 1 is a front perspective view of a two panel embodiment of the apparatus in use with a three point seatbelt.

In the embodiment shown in FIG. 1 and FIG. 2, the apparatus 10 has a lap panel 12 mounted to the lower section of 14 of a standard three-point seatbelt and a chest panel 16 mounted to the upper shoulder section 18 of the seatbelt. The functional and safety aspects of current three-point seatbelts remain unchanged. For the lap panel 12 and chest panel 16 ventilator embodiment of FIG. 1 and FIG. 2, there are no changes to the buckle or pulley hardware 20, belt webbing, or retractor spool 28 that are required. For the lap-plus-chest length of FIG. 4A and FIG. 4B, however, it may be necessary for the conventional buckle hardware to be modified to allow the ventilation air to pass by the buckle 46 or the pulley 44.

FIG. 2 is a schematic side view of the lap-chest embodiment of the apparatus of FIG. 1 installed on a conventional lap and chest belt of a vehicle. A cooling/heating unit 22 has a fan and at least one duct 24 attached to the lap panel 12 of the apparatus. A second duct 26 can be used to provide air from the cooling/heating unit 22 to the shoulder panel 16 as seen in FIG. 3A. The fan of the cooling/heating unit 22 supplies conditioned air into the lap panel 12 from below the seat. The air supply delivered to the bottom of the seatbelt ventilating lap panel 12 comes in through a duct 24 preferably made of molded plastic that is approximately the same diameter as the lap panel 12 itself.

The chest panel 16 of the apparatus is connected with an upper duct 26 either directly to the conditioning unit 22 or through the lower lap panel 12 so that conditioned air is provided to the chest panel 16 of the apparatus. The upper air duct 26 preferably traces the length of the lap belt 14 and around the buckle hardware 20 and the shoulder belt 18 to deliver air to the chest panel 16 of the apparatus.

In an alternative embodiment, the conditioned air from the conditioning unit 22 is directed through the lower duct 24 to the lap panel 12 and then through the upper duct 26 that is connected on the opposite end of panel 12 as the lower duct 24. In one embodiment there is a ducting transition from the lap panel 12 to the chest segment 16. The transition section transfers the air from one side of the belt to the other (this is necessary since the 'top' of the belt switches at the buckle).

Figure 5:
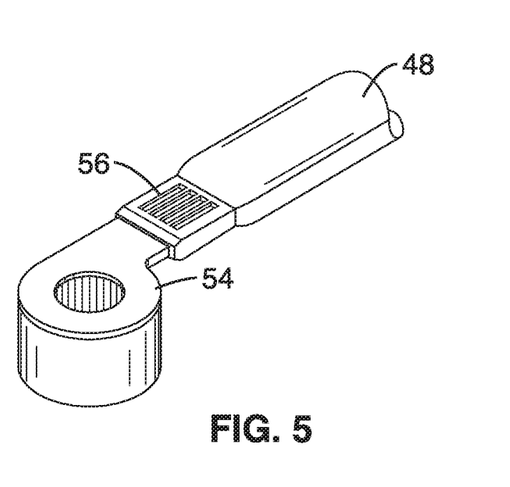
FIG. 5 is a side view of one embodiment of a blower attached to a panel with a cutaway to show heating or cooling elements disposed in the interior airflow.

The source of the intake air for the system may be drawn from the cabin or from ductwork in the automobile body from the exterior of the vehicle. The system air may then be heated or cooled with its own conditioning system that is independent of the conditioning system of the vehicle. For example, the air may be cooled or heated with a thermoelectric cooler/heater positioned either upstream or downstream from the fan that is configured to deliver a stream of cool/hot air into the duct 24 and lap panel 12 as shown in FIG. 5. However, in an alternative embodiment, the lap panel 12 and shoulder panel 16 may be supplied with cooled/heated air that is ducted from the automobile central air conditioning system. For the system in its ventilation mode or actively cooled mode, drawing supply air from the floor portion of the cabin brings in the coolest air available in the cabin of the vehicle.

Accordingly, control over the actuation and temperature of the air flow produced by the cooling/heating unit 22 can be through control of the vehicle conditioning system controls or through individual control over the cooling/heating unit 22 elements depending on the selected configuration of the system. Preferably, the cooling/heating unit 22 has controls that provide control over the air temperature and the amount of air that is blown into the housing and to the occupant of the seat. The cooling/heating unit 22 may also have temperature and pressure sensors to monitor the air flowing into the housing. The controller can control the temperature and volume of air that is being emitted by the diffuser elements of the housing to the occupant. System fan and temperature controls may be mounted on the seatbelt 14, lap 12 or chest 16 panels or incorporated as part of the automobile central HVAC controls.

FIG. 3A is a top view of one embodiment of the lap panel 12 of the apparatus that has a sleeve that receives the seatbelt 14 to secure the lap panel 12. In other embodiments, the lap panel 12 and chest panel 16 may be secured to the belt sections by stitching, hook and loop fasteners or one or more straps.

The lap panel 12 of the embodiment of FIG. 3A has an upper air input duct 26 passing through the panel housing providing conditioned air to the housing of chest panel 16. Air duct 26 may also be coupled to the outside of the panel 12 housing.

Figure 3B:
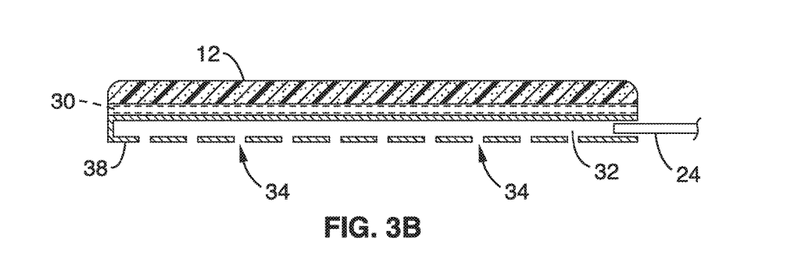
FIG. 3B is a cross sectional view of the panel of the apparatus taken along the lines 3B-3B of FIG. 3A.
Figure 4A:
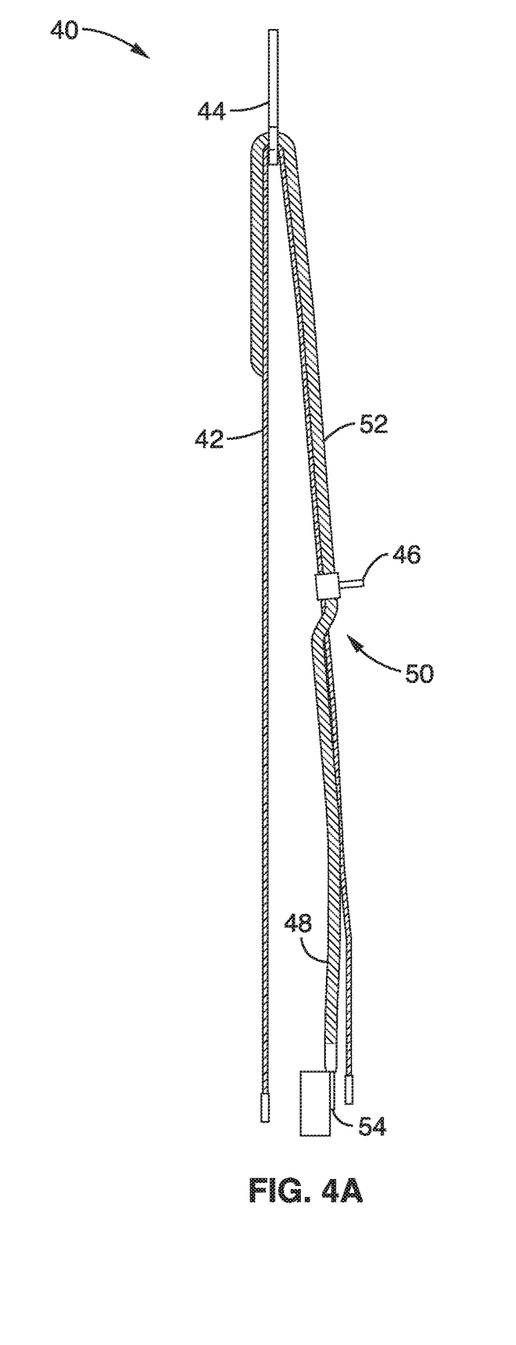
FIG. 4A is a side view of a single panel embodiment of the apparatus that is retracted when not in use.
Figure 4B:
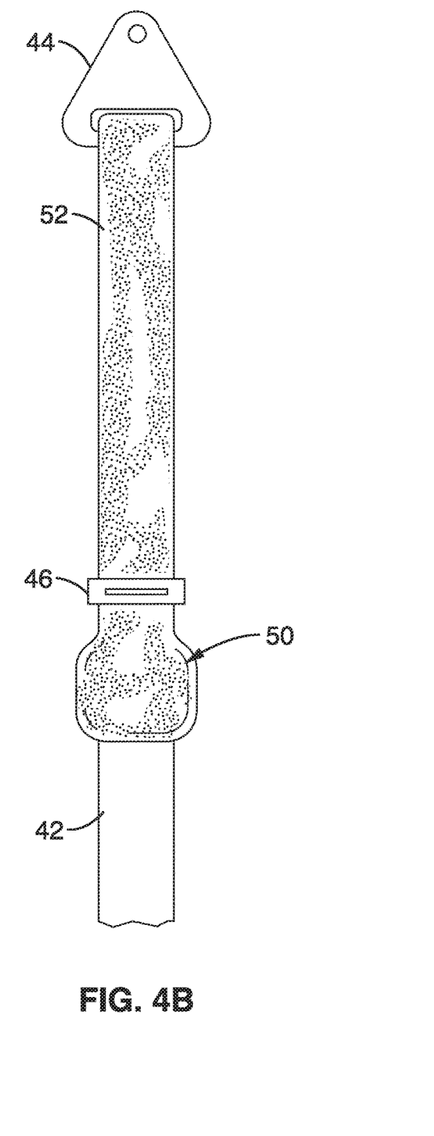
FIG. 4B is a front view of the embodiment of the apparatus shown in FIG. 4A.

The cross-sectional view of the lap panel 12 shown in FIG. 3B is taken along the lines 3B-3B of FIG. 3A. It can be seen from FIG. 3B that a sleeve 30 is configured to receive the lap section 14 of the seatbelt. The lower air delivery duct 24 in this embodiment delivers air to the interior 32 of the lap panel 12 housing and out of the diffuser 38 outlets 34. Although diffuser outlets 34 are shown as perforations in this embodiment, it will be understood that the conditioned air may be expressed from the interior 32 of the lap panel 12 or chest panel 16 by meshes, rotatable slot diffusers, multiple nozzles, or other types of directional vents.

Lap panel 12 and chest panel 16 can have diffuser 38 sections on the bottom side of the housing, as shown in FIG. 3B, as well as on the side sections or top sections in various embodiments. Side diffuser 38 sections in the panels allow air to flow generally parallel to the seatbelt, at the occupant and to the surrounding regions for a wider distribution of air to the occupant rather than delivering narrowly at the point of seatbelt contact.

Air flows out of the diffuser outlets 34 of diffuser 38 of the lap panel 12 or chest panel 16 to convectively, evaporatively, and conductively cool the pelvic and chest regions of the wearer. This local cooling is highly efficient at cooling the front of the torso and dissipating the body's thermal plume. In a hot car, the thermal plume is undesirable for both comfort and the passenger's perception of air quality.

Likewise, heated air can be delivered to the panels and emitted through the diffusers 38 at the various locations on the panel housings to specifically apply heated air to the body of occupant of the seat. Heated air from the lap 12 and chest panels 16 may also be very efficient at warming the body, depending on the passenger's clothing. In one embodiment, a thermoelectric heat exchanger in the intake air supply duct is provided that is located just upstream or downstream of a blower to provide heated air instantaneously.

There are many advantages and benefits that can be seen with the specialized delivery of hot or cold air through the lap and chest panels. For example, one advantage local delivery has over over cabin air conditioning is energy efficiency. In fuel-efficient automobiles (conventional, hybrid, and all-electric), cooling and heating of the passenger cabin imposes high demands on the batteries and fuel economy. Conventional vehicle heating and cooling systems must be oversized to be able to rapidly provide comfort for passengers entering the vehicle at very low or high ambient temperatures. Any measure that reduces the size of this air temperature conditioning system benefits the system operation of the vehicle under normal steady-state operations.

Another advantage of local delivery through the panels on a seatbelt is occupant comfort. Comfort effects realized with air deliveries through the panels are more immediate and localized than found in conventional air conditioning systems. With this system, air is not blown into the eyes or across the hands of the driver as experienced with dashboard-mounted HVAC outlets. For cooling a passenger in a hot cabin, the direct local application of air movement (either at ambient cabin temperature or cooled below it) in the boundary layer of the torso/pelvis region has a rapid effect on comfort and requires relatively little power compared to cooling the entire cabin. This location is very effective at removing body heat and disrupting the body's heated thermal plume which is a detriment to comfort and perceived air quality under warm and hot conditions. For heating the passenger in a cold cabin, the pelvic region is (together with feet and hands) the most important part of the body for the perception of comfort.

Accordingly, low-power direct cooling of vehicle passengers after entering a heat-soaked cabin allows the cooling system (AC) of the vehicle to be downsized and made more efficient. Similarly, low-power direct heating of passengers in a cold-soaked cabin reduces the required heating capacity of the automobile's heater. During steady-state operation, the ventilated seatbelt reduces the power required to condition the air in the cabin (applies to both heating and cooling).

Another advantage is that the system does not modify the standard three-point seatbelt web material, strength, retractability, ease of use, buckle or shoulder-pulley hardware. Appearance can also be minimal. Fans and potential thermoelectric heaters are positioned out of the way with convenient access to heat source/sinks in the vehicle body. System fan and temperature controls may be mounted on the belt or be part of the automobile central heating and cooling (HVAC) controls.

It will be seen that there can be several different variations of the ventilated seatbelt panels as shown in FIG. 4A, FIG.

4B and FIG. 5. In the alternative embodiment shown in FIG. 4A and FIG. 4B, the lap and chest panels are combined and the apparatus has a continuous interior through its length and has diffusers located at lap and chest positions to distribute the air when the belt is locked in place. The continuous housing is preferably air tight and elastic so that it can expand so that the interior volume is increased. In one embodiment, the housing is pleated so that it lays flat in the absence of any interior pressure and can pass through seatbelt pulleys and sliding buckle hardware. In this embodiment, the air does not encounter any crimping resistance within the housing from the air source attachment point up through the end of the lap-belt portion. In another embodiment, the housing only extends from an air source attachment point to a point near the buckle.

In the embodiment shown in FIG. 4A and FIG. 4B, a lap-plus-chest-length version is shown that may require a modified buckle fitting to allow the supply air to efficiently pass beyond the lap portion of the seatbelt and around the buckle to the chest portion.

The apparatus 40 shown in FIG. 4A and FIG. 4B is in the resting position while it is not in use. The housing is mounted to a conventional seatbelt 42 that is anchored on both ends to the floor and near the center of the seatbelt with a pulley 44 that is anchored to a column of the frame of the vehicle. One end of the seatbelt is often coupled to a belt retractor (not shown). For the lap-length apparatus there are no changes in buckle 46 or pulley 44 hardware, belt webbing, or retractor spool. However, it may be necessary to modify the buckle and pulley 44 fittings to allow the supply air to efficiently pass beyond the lap portion of the belt around the buckle 46. Nevertheless, the functional and safety aspects of current three-point seatbelts remain unchanged.

The lower or lap section 48 of the housing is mounted on one side of the seatbelt 42 and transition 50. The upper or chest section 52 is mounted to the opposite side of the seatbelt 42 and to the transition 50. This embodiment allows the lap section 48 and the chest section 52 of the housing to be on the outer surface of belt 42 when the buckle 46 is engaged. In addition, the seatbelt 42 is always against the body of the occupant of the seat and the seatbelt engages the buckle 46 and pulley 44 as in a conventional setting. The transisition 50 may exceed the width of the seatbelt 42 and may balloon to a volume that maintains a suitable airflow into the chest section 52 of the housing.

The housing is preferably an airtight material that is flexible and collapsable so that it will move through the openings of the pulley 44 and buckle 46 when the interior air pressure is removed and belt 42 is retracted.

The lower section 48 of the housing is coupled to an air source 54 that provides ambient air or air that is heated or cooled air to the interior of the housing. The lap section 48 and the chest section 52 of the housing also have air emitting sections of mesh or perforations or directional nozzles. Even movement of ambient air inherently cools the body of the occupant and disrupts the upward flowing thermal plume. Ventilated air plus a thermoelectric unit installed either upstream or downstream from the fan of the air source 54 can be used to deliver heated or cooled air to the occupant through the housing.

In the embodiment shown in FIG. 5, an electric blower 54 coupled to the bottom of the lap section 48, near the floor of the vehicle, can pull the air out of the car cabin directly into the blower. In another embodiment, the supply air is drawn out of a duct in the car body leading to the HVAC system of the vehicle.

The blower 54 can have heating and cooling elements 56 in the airstream produced by the blower 54. The elements 56 or the blower 54 can include temperature sensors and a control unit that can be controlled independently or by the air temperature control system of the vehicle. The cooler/heater elements 56 of blower 54 can be reversible by reversing electric current in one embodiment.

Alternatively, the housing can also be pressurized by the car's HVAC system directly. Ventilation plus cooled/heated air from the automobile HVAC system can be ducted to the lower section 48 of the housing. Thermoelectric heat rejection to the metal chassis or to the air (in the cabin, in vehicle cavity space, or to the outside on the underside of the vehicle) are also possible.

From the discussion above it will be appreciated that the technology described herein can be embodied in various ways, including the following:

1. An apparatus for the efficient cooling or heating of vehicle passengers, comprising: (a) a housing with one or more air intake ports and a plurality of diffusers and; (b) at least one fastener on the housing configured to couple the housing to a seatbelt; (c) a source of ambient temperature, heated or cooled air; and (d) a blower coupled to the source of air and to the air intake ports of the housing and diffusers; (e) wherein heated or cooled or ambient temperature air from the source of air is emitted from the diffusers.

2. The apparatus of any previous embodiment, wherein the housing further comprises a central chamber connected to the intake port and to the diffusers, wherein air from the air source fills the chamber through the intake port and is emitted from the housing through the diffusers.

3. The apparatus of any previous embodiment, wherein the housing further comprises a transition chamber configured to join a chamber of a housing section mounted on one side of a seatbelt to a chamber of a housing section mounted to an opposite side of the seatbelt.

4. The apparatus of any previous embodiment, wherein the diffusers of the housing are diffusers selected from the group of diffusers consisting of directional nozzles, mesh, and housing perforations.

5. The apparatus of any previous embodiment, wherein the fastener for coupling the housing to a seatbelt comprises a sleeve configured to receive and retain a seatbelt.

6. The apparatus of any previous embodiment, wherein the fastener for coupling the housing to a seatbelt is a fastener selected from the group of fasteners consisting of a hook and loop fastener, a thread fastener, a snap fastener, a clip fastener and an adhesive fastener.

7. The apparatus of any previous embodiment, wherein the source of ambient temperature, heated or cooled air comprises: a controller; a thermoelectric heating element; and a refrigerant cooling element disposed upstream or downstream of the blower; wherein the actuation of the heating and cooling elements and the blower are controlled by the controller.

8. The apparatus of any previous embodiment, further comprising: one or more temperature sensors; and one or more pressure sensors; wherein the temperature and pressure of air delivered to the housing are sensed by the sensors and controlled by the controller.

9. The apparatus of any previous embodiment, wherein the source of ambient temperature, heated or cooled air and blower comprises air from a climate control system and fan of a vehicle and ducts from the vehicle climate control system to the intake port of the housing.

10. An apparatus for the efficient cooling or heating of vehicle passengers, comprising: (a) a seatbelt comprising a lap portion, a chest portion and a buckle; and (b) a climate control device coupled to the lap portion of the seatbelt, comprising: (i) a housing, the housing having an intake port, a chamber and one or more diffusers; (ii) a source of ambient temperature, heated or cooled air; and (iii) a blower coupled to the source of air and to the air intake ports of the housing and diffusers; (iv) wherein heated or cooled or ambient temperature air from the source of air is emitted from the diffusers.

11. The apparatus of any previous embodiment, wherein the source of ambient temperature, heated or cooled air comprises: a controller; a thermoelectric heating element; and a refrigerant cooling element disposed upstream or downstream of the blower; wherein the actuation of the heating and cooling elements and the blower are controlled by the controller.

12. The apparatus of any previous embodiment, further comprising: one or more temperature sensors; and one or more pressure sensors; wherein the temperature and pressure of air delivered to the housing are sensed by the sensors and controlled by the controller.

13. The apparatus of any previous embodiment, wherein the source of ambient temperature, heated or cooled air comprises air from a climate control system of a vehicle and ducts from the vehicle climate control system to the intake port of the housing.

14. The apparatus of any previous embodiment, wherein the diffusers of the housing are diffusers selected from the group of diffusers consisting of directional nozzles, mesh, and housing perforations.

15. The apparatus of any previous embodiment, further comprising: (a) a second housing with an intake port, a chamber and one or more diffusers mounted to the chest portion of the seatbelt; and (b) a duct coupled to the intake port of the second housing and to the blower; (c) wherein air from the source of ambient temperature, heated or cooled air is delivered to the second housing and diffusers by the blower.

16. The apparatus of any previous embodiment, wherein the diffusers of the second housing are diffusers selected from the group of diffusers consisting of directional nozzles, mesh, and housing perforations.

17. An apparatus for the efficient cooling or heating of vehicle passengers, comprising: (a) a seatbelt comprising a lap portion, a chest portion and a buckle; and (b) a climate control device coupled to the lap portion of the seatbelt, comprising: (i) a first housing with an intake port, a chamber and one or more diffusers; (ii) a second housing with an intake port, a chamber and one or more diffusers mounted to the chest portion of the seatbelt; (iii) a source of ambient temperature, heated or cooled air; and (iv) a blower coupled to the source of air and to the air intake ports of the first housing and the second housing; (v) wherein heated or cooled or ambient temperature air from the source of air is emitted from the diffusers of the first housing and second housing.

18. The apparatus of any previous embodiment, wherein the source of ambient temperature, heated or cooled air comprises: a controller; a thermoelectric heating element; and a refrigerant cooling element disposed upstream or downstream of the blower; wherein the actuation of the heating and cooling elements and the blower are controlled by the controller.

19. The apparatus of any previous embodiment, further comprising: one or more temperature sensors; and one or more pressure sensors; wherein the temperature and pressure of air delivered to the first and second housings are sensed by the sensors and controlled by the controller.

20. The apparatus of any previous embodiment, wherein the source of ambient temperature, heated or cooled air comprises air from a climate control system of a vehicle and ducts from the vehicle climate control system to the intake port of the housing.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for the efficient cooling or heating of vehicle passengers, comprising:
   (a) a housing with one or more air intake ports and a plurality of diffusers;
   (b) at least one fastener on said housing configured to couple the housing to a seatbelt;
   (c) a source of ambient temperature, heated or cooled air;
   (d) a blower coupled to the source of air and to the air intake ports of the housing and diffusers;
   (e) wherein heated or cooled or ambient temperature air from the source of air is emitted from the diffusers;
   (f) wherein said source of ambient temperature, heated or cooled air comprises:
      (i) a controller;
      (ii) a thermoelectric heating element; and
      (iii) a refrigerant cooling element disposed upstream or downstream of the blower;
      (iv) wherein the actuation of the heating and cooling elements and the blower are controlled by the controller;
   (g) one or more temperature sensors; and
   (h) one or more pressure sensors;
   (i) wherein the temperature and pressure of air delivered to the housing are sensed by the sensors and controlled by the controller.

2. An apparatus as recited in claim 1, wherein said housing further comprises a central chamber connected to the intake port and to the diffusers, wherein air from the air source fills said central chamber through the intake port and is emitted from the housing through the diffusers.

3. An apparatus as recited in claim 2, wherein said housing further comprises a transition chamber configured to join a chamber of a housing section mounted on one side of a seatbelt to a chamber of a housing section mounted to an opposite side of the seatbelt.

4. An apparatus as recited in claim 1, wherein said diffusers of said housing are diffusers selected from the group of diffusers consisting of directional nozzles, mesh, and housing perforations.

5. An apparatus as recited in claim 1, wherein at least one said fastener for coupling the housing to said seatbelt comprises a sleeve configured to receive and retain a seatbelt.

6. An apparatus as recited in claim 1, wherein at least one said fastener for coupling the housing to said seatbelt is a fastener selected from the group of fasteners consisting of a hook and loop fastener, a thread fastener, a snap fastener, a clip fastener and an adhesive fastener.

7. An apparatus for the efficient cooling or heating of vehicle passengers, comprising:
（a) a housing with one or more air intake ports and a plurality of diffusers;
(b) at least one fastener on said housing configured to couple the housing to a seatbelt;
(c) a source of ambient temperature, heated or cooled air; and
(d) a blower coupled to the source of air and to the air intake ports of the housing and diffusers;
(e) wherein heated or cooled or ambient temperature air from the source of air is emitted from the diffusers;
(f) wherein said source of ambient temperature, heated or cooled air and blower comprises air from a climate control system and fan of a vehicle and ducts from the vehicle climate control system to the intake port of the housing.

8. An apparatus as recited in claim 7, wherein said housing further comprises a central chamber connected to the intake port and to the diffusers, wherein air from the air source fills said central chamber through the intake port and is emitted from the housing through the diffusers.

9. An apparatus as recited in claim 8, wherein said housing further comprises a transition chamber configured to join a chamber of a housing section mounted on one side of a seatbelt to a chamber of a housing section mounted to an opposite side of the seatbelt.

10. An apparatus as recited in claim 7, wherein said diffusers of said housing are diffusers selected from the group of diffusers consisting of directional nozzles, mesh, and housing perforations.

11. An apparatus as recited in claim 7, wherein at least one said fastener for coupling the housing to said seatbelt comprises a sleeve configured to receive and retain a seatbelt.

12. An apparatus as recited in claim 7, wherein at least one said fastener for coupling the housing to said seatbelt is a fastener selected from the group of fasteners consisting of a hook and loop fastener, a thread fastener, a snap fastener, a clip fastener and an adhesive fastener.

13. An apparatus for the efficient cooling or heating of vehicle passengers, comprising:
(a) a seatbelt comprising a lap portion, a chest portion and a buckle;
(b) a climate control device coupled to the lap portion of the seatbelt, comprising:
(i) a housing, the housing having an intake port, a chamber and one or more diffusers;
(ii) a source of ambient temperature, heated or cooled air; and
(iii) a blower coupled to the source of air and to the air intake ports of the housing and diffusers;
(iv) wherein heated or cooled or ambient temperature air from the source of air is emitted from the diffusers;
(c) wherein said source of ambient temperature, heated or cooled air comprises:
(i) a controller;
(ii) a thermoelectric heating element; and
(iii) a refrigerant cooling element disposed upstream or downstream of the blower;
(iv) wherein the actuation of the heating and cooling elements and the blower are controlled by the controller;
(d) one or more temperature sensors; and
(e) one or more pressure sensors;
(f) wherein the temperature and pressure of air delivered to the housing are sensed by the sensors and controlled by the controller.

14. An apparatus as recited in claim 13, wherein said diffusers of said housing are diffusers selected from the group of diffusers consisting of directional nozzles, mesh, and housing perforations.

15. An apparatus for the efficient cooling or heating of vehicle passengers, comprising:
(a) a seatbelt comprising a lap portion, a chest portion and a buckle; and
(b) a climate control device coupled to the lap portion of the seatbelt, comprising:
(i) a housing, the housing having an intake port, a chamber and one or more diffusers;
(ii) a source of ambient temperature, heated or cooled air; and
(iii) a blower coupled to the source of air and to the air intake ports of the housing and diffusers;
(iv) wherein heated or cooled or ambient temperature air from the source of air is emitted from the diffusers;
(c) wherein said source of ambient temperature, heated or cooled air comprises air from a climate control system of said vehicle and ducts from the vehicle climate control system to the intake port of the housing.

16. An apparatus as recited in claim 15, wherein said diffusers of said housing are diffusers selected from the group of diffusers consisting of directional nozzles, mesh, and housing perforations.

17. An apparatus for the efficient cooling or heating of vehicle passengers, comprising:
(a) a seatbelt comprising a lap portion, a chest portion and a buckle;
(b) a climate control device coupled to the lap portion of the seatbelt, comprising:
(i) a first housing, the first housing having an intake port, a chamber and one or more diffusers;
(ii) a source of ambient temperature, heated or cooled air; and
(iii) a blower coupled to the source of air and to the air intake ports of the first housing and diffusers;
(iv) wherein heated or cooled or ambient temperature air from the source of air is emitted from the diffusers;
(c) a second housing with an intake port, a chamber and one or more diffusers mounted to the chest portion of the seatbelt; and
(d) a duct coupled to the intake port of the second housing and to the blower;
(e) wherein air from the source of ambient temperature, heated or cooled air is delivered to the second housing and diffusers by the blower.

18. An apparatus as recited in claim 17, wherein said diffusers of said second housing are diffusers selected from the group of diffusers consisting of directional nozzles, mesh, and housing perforations.

19. An apparatus for the efficient cooling or heating of vehicle passengers, comprising:
 (a) a seatbelt comprising a lap portion, a chest portion and a buckle;
 (b) a climate control device coupled to the lap portion of the seatbelt, comprising:
  (i) a first housing with an intake port, a chamber and one or more diffusers;
  (ii) a second housing with an intake port, a chamber and one or more diffusers mounted to the chest portion of the seatbelt;
  (iii) a source of ambient temperature, heated or cooled air; and
  (iv) a blower coupled to the source of air and to the air intake ports of the first housing and the second housing;
  (v) wherein heated or cooled or ambient temperature air from the source of air is emitted from the diffusers of the first housing and second housing;
 (c) wherein said source of ambient temperature, heated or cooled air comprises:
  a controller;
  a thermoelectric heating element; and
  a refrigerant cooling element disposed upstream or downstream of the blower;
  wherein the actuation of the heating and cooling elements and the blower are controlled by the controller;
 (d) one or more temperature sensors; and
 (e) one or more pressure sensors;
 (f) wherein the temperature and pressure of air delivered to the first and second housings are sensed by the sensors and controlled by the controller.

20. An apparatus as recited in claim 19, wherein said source of ambient temperature, heated or cooled air comprises air from a climate control system of a vehicle and ducts from the vehicle climate control system to the intake port of the housing.

* * * * *